US011440487B2

(12) United States Patent
Dickinson et al.

(10) Patent No.: US 11,440,487 B2
(45) Date of Patent: Sep. 13, 2022

(54) OVERMOLDED METAL-PLASTIC CLIP (71) Applicant: Termax LLC, Lake Zurich, IL (US)

(72) Inventors: Daniel James Dickinson, Lincolnshire, IL (US); David Friesorger, Lakemoor, IL (US)

(73) Assignee: TERMAX LLC, Lake Zurich, IL (US)

( * ) Notice: Subject to any disclaimer, the term of this patent is extended or adjusted under 35 U.S.C. 154(b) by 82 days.

(21) Appl. No.: 16/925,246

(22) Filed: Jul. 9, 2020

(65) Prior Publication Data

US 2020/0339045 A1 Oct. 29, 2020

Related U.S. Application Data

(63) Continuation-in-part of application No. 16/739,111, filed on Jan. 9, 2020, which is a continuation-in-part of application No. 14/147,522, filed on Jan. 4, 2014, which is a continuation-in-part of application No. 13/476,957, filed on May 21, 2012, now abandoned, application No. 16/925,246, which is a continuation-in-part of application No. 14/806,651, filed on Jul. 23, 2015, now abandoned.

(60) Provisional application No. 62/888,433, filed on Aug. 16, 2019, provisional application No. 62/891,419, filed on Aug. 25, 2019.

(51) Int. Cl.
*F16B 5/06* (2006.01)
*B60R 13/02* (2006.01)

(52) U.S. Cl.
CPC ........ *B60R 13/0206* (2013.01); *F16B 5/0664* (2013.01); *F16B 5/065* (2013.01); *Y10T 24/30* (2015.01)

(58) Field of Classification Search
CPC ...... F16B 5/0657; F16B 5/065; F16B 21/075; Y10T 24/44026; B60R 13/04; B60R 13/0206
See application file for complete search history.

(56) References Cited

U.S. PATENT DOCUMENTS

| 5,533,237 | A * | 7/1996 | Higgins | F16B 5/065 24/289 |
| 5,542,158 | A * | 8/1996 | Gronau | F16B 5/065 24/289 |
| 5,887,319 | A * | 3/1999 | Smith | F16B 5/0642 24/293 |
| 6,381,811 | B2 * | 5/2002 | Smith | F16B 5/0614 24/289 |
| 2006/0290155 | A1 * | 12/2006 | Smith | B60R 11/00 296/29 |
| 2019/0017527 | A1 * | 1/2019 | Dickinson | F16B 5/0614 |

(Continued)

*Primary Examiner* — Robert Sandy
*Assistant Examiner* — Michael S Lee (57) ABSTRACT

A system and method including a fastener clip, the fastener clip including a first piece made of an elastic first material. The first piece includes a pair of legs joined at a head portion, and one or more pairs of barbs coupled to the pair of legs. The barbs are configured to dig into the blade and to secure the fastener clip to the blade at least based upon the fastener clip being placed over the blade. The fastener clip includes a second piece made of a softer second material. The second piece includes inside and outside portions to the outside and to the inside of the first piece. The outside portions are configured to engage a slot in a chassis.

10 Claims, 7 Drawing Sheets

(56) References Cited

U.S. PATENT DOCUMENTS

2019/0170178 A1\* 6/2019 Leverger ............... F16B 21/075
2020/0149565 A1\* 5/2020 Vorderwisch ............. F16B 2/20

\* cited by examiner

OVERMOLDED METAL-PLASTIC CLIP

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a blade attached to the base and wings attached at least to the top of the blade at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the slot in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

Figure 1:
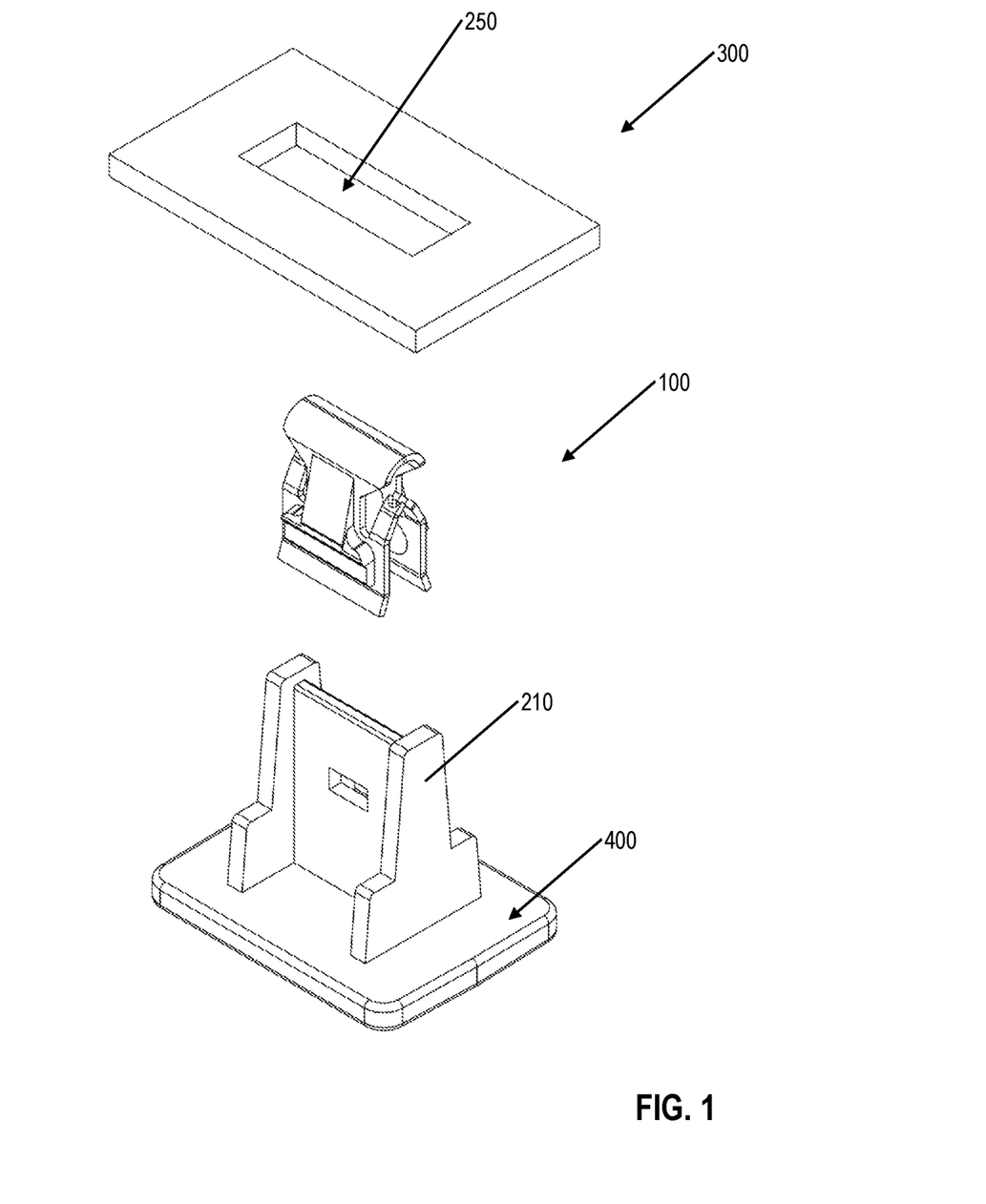
FIG. 1 is a perspective view of a fastener clip assembly, in accordance with some embodiments.

FIG. 1 is a perspective view of a fastener clip assembly, in accordance with some embodiments.

In some embodiments, fastener clip 100 is configured to fasten together top surface 300 and bottom surface 400. Blade 210, which extends from surface 400, is configured to receive and be secured to fastener clip 100. In some embodiments, blade 210 may be molded onto surface 400. In other embodiments, blade 210 may be attached to surface 400 using various other means.

In some embodiments, fastener clip 100 may be configured to be inserted through slot 250 of top surface 300 and to secure itself to the top surface 300. In some embodiments, the fastener clip assembly is configured to fasten together top surface 300 and bottom surface 400 based at least upon the fastener clip being secured to slot 250 of surface 300 and to blade 210 of surface 400.

In some embodiments, surface 400 may be part of a panel and surface 300 may be part of the chassis/frame of an automobile. Accordingly, the fastener clip assembly may be configured to fasten together a panel to the chassis/frame of an automobile.

Figure 2:
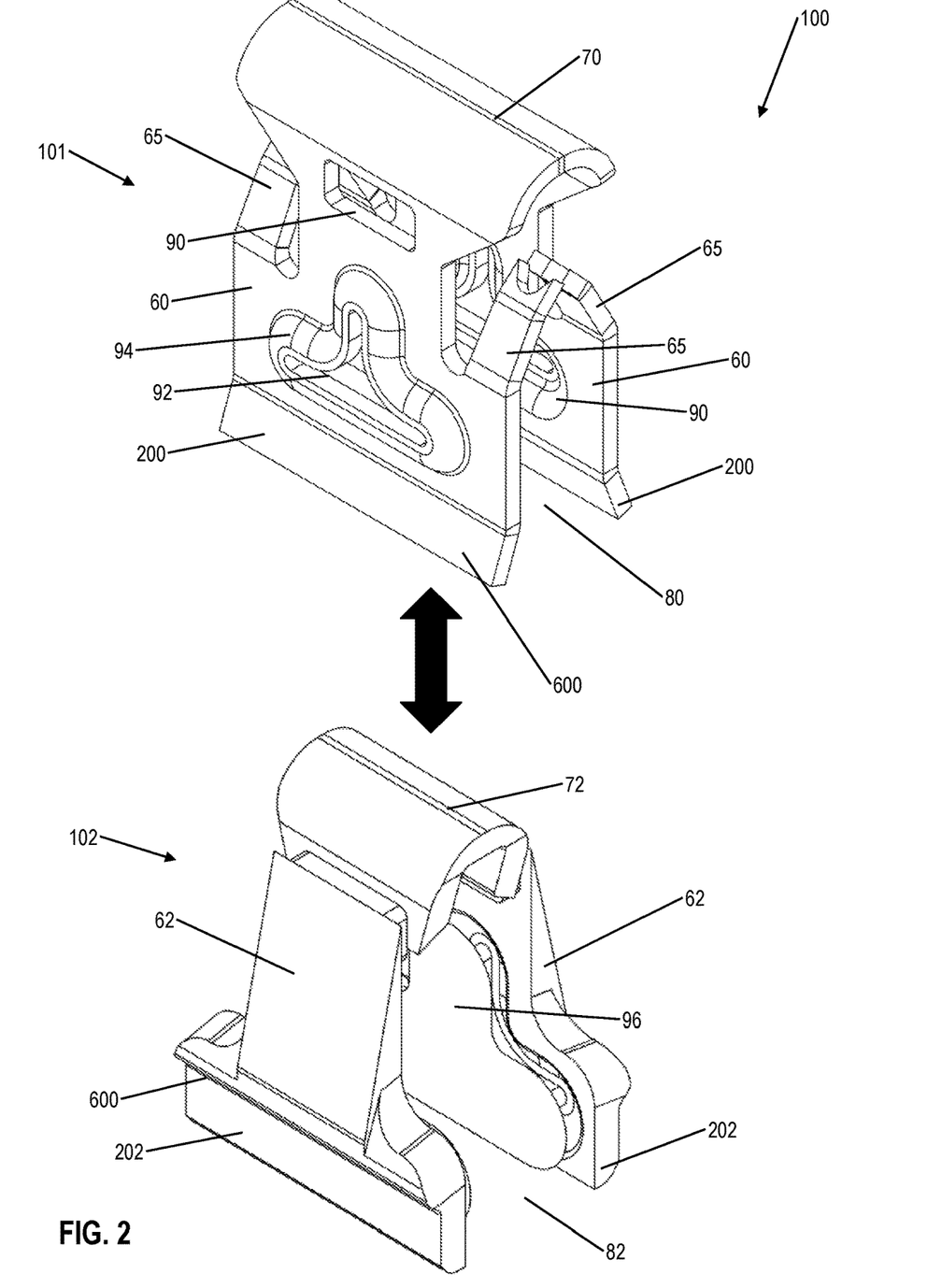
FIG. 2 is a perspective view of two pieces of a fastener clip, in accordance with some embodiments.

FIG. 2 is a perspective view of two pieces of a fastener clip, in accordance with some embodiments.

Figure 3:
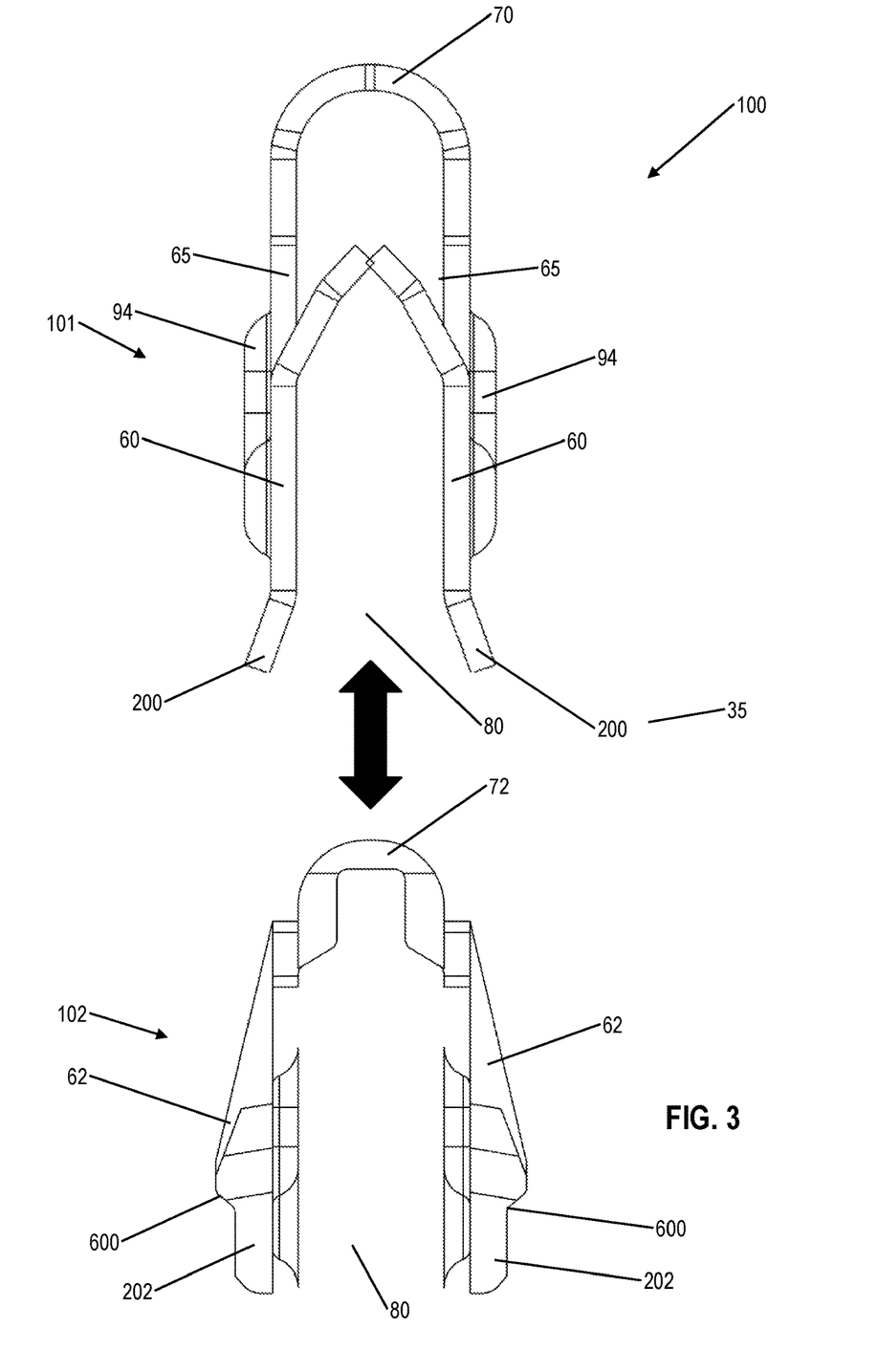
FIG. 3 is another perspective view of two pieces of a fastener clip, in accordance with some embodiments.

FIG. 3 is another perspective view of two pieces of a fastener clip, in accordance with some embodiments.

Figure 4:
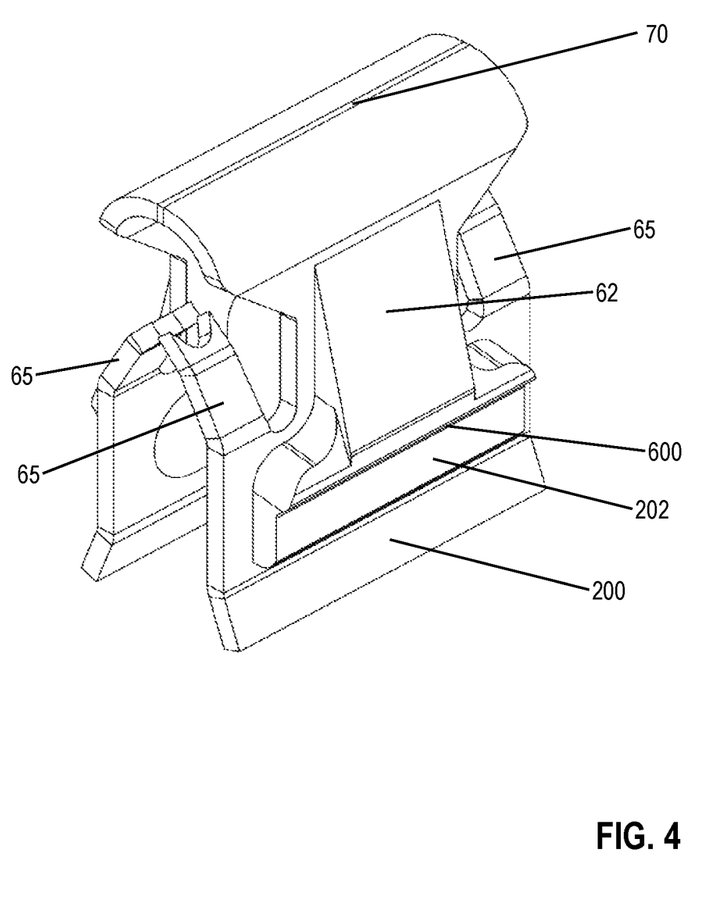
FIG. 4 is yet another perspective view of two pieces of a fastener clip, in accordance with some embodiments.

FIG. 4 is yet another perspective view of two pieces of a fastener clip, in accordance with some embodiments.

Figure 5:
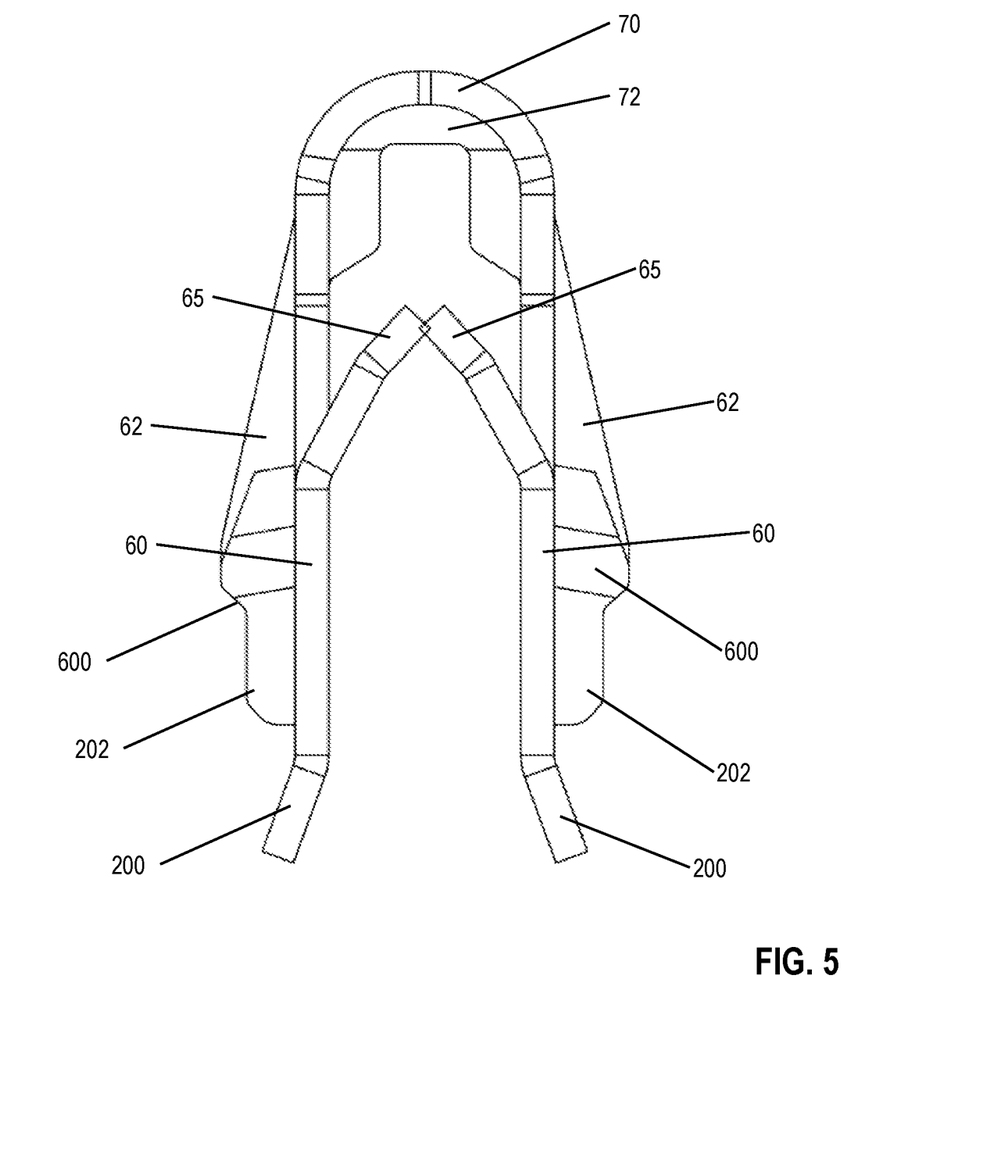
FIG. 5 is yet another perspective view of two pieces of a fastener clip, in accordance with some embodiments.

FIG. 5 is yet another perspective view of two pieces of a fastener clip, in accordance with some embodiments.

In some embodiments, fastener clip 100 may be made of at least two different materials. The first material may be one with high elasticity/springiness (such as metal, for example) to allow the clip to spring between at least two positions to facilitate insertion and engagement. The second material may be a softer material (such as plastic, for example) to allow the clip to form better and/or safer contact with the surfaces with which the clip is to engage. Such softer material may prevent, for example, early wear of either the clip or the surfaces engaged by the clip.

In some embodiments, fastener clip 100 may be made with a combination of metal and an injection moldable plastic. In some embodiments, the metal portion may be made first, using sheet metal made of steel and a stamping process, for example. The plastic may be then injected around the metal. In some embodiments, the plastic may be injected both to the inside and to the outside of the metal clip as will be described further elsewhere.

In some embodiments, fastener clip 100 comprises first piece 101 and a second piece 102 that are combined to form the fastener clip 100. In some embodiments, first piece 101 may be made of an elastic/springy material such as metal, and second piece 102 may be made of a softer material such as plastic.

In some embodiments, first piece 101 includes a pair of legs 60 joined at a head portion 70. The pair of legs 60 form a clip opening 80 at an opposite end of the head portion 70 to allow entry of a blade 210 to which clip 100 is configured to attach. In some embodiments, each of legs 60 terminate at the end opposite to head portion 70 to feet 200.

In some embodiments, first piece 101 may also include, on each leg 60, windows 90 and 92 that may be configured to permit the molded material of piece 102 to flow between the inside and the outside of piece 101. In some embodiments, molding the material of second piece 102 between the inside and the outside of first piece 102 significantly strengthens the coupling between first piece 101 and second piece 102. Additionally, first piece 101 may include protrusions, such as protrusion 94, to further enhance the coupling between first piece 101 and second piece 102.

In some embodiments, first piece 101 may also include a pair of barbs on each of the legs 60 (four barbs, in one embodiment). In some embodiments, barbs 65 are each attached to the sides of the legs 60. Based at least on barbs 65 being sharp at their ends and of greater hardness than the material of blade 210, the barbs are configured to dig into and attach the first piece 101 to the blade 210 upon inserting the fastener clip 100 over the blade 210.

In some embodiment, upon inserting fastener clip 100 over blade 210, the blade 210 is configured to bend barbs 65 apart, and the barbs 65 are configured to spring back against the blade 210. During insertion, blade 210 slides upwards towards barbs 65, which are also pushed apart by blade 210. Upon inserting the clip 100 over blade 210, barbs 65 are configured to dig into the material of blade 210 to further increase the removal effort required to separate the clip from the blade. Furthermore, barbs 65 provide additional support for the coupling between the fastener clip 100 and the blade 210.

In some embodiments, second piece 102 includes a pair of legs 62 joined at a head portion 72. The pair of legs 62 form a clip opening 82 at an opposite end of the head portion 72 to allow entry of a blade 210 to which clip 100 is configured to attach. In some embodiments, each of legs 62 terminate at the end opposite to head portion 72 to feet 202.

In some embodiments, second piece 102 may be injection molded around first piece 101.

In some embodiments, portions of second piece 102 may be molded to the outside of the first piece 101 while other portions of second piece 102 may be molded to the inside of the first piece 101.

In some embodiments, the second piece 102 may be molded as one continuous piece and may be weaved inside and outside of first piece 101 through windows 90 and 92, for example. In some embodiments, legs 62 and feet 202 may be to the outside of first piece 101 while head portion 72 and inner pieces 96 may be to the inside of first piece 101. In some embodiments, weaving the second piece in such a manner significantly enhances the coupling between the first and second pieces. For example, by having the strength and elasticity of the first piece behind the second piece where the second piece is configured to engage the slot 250 (as will be described more later) significantly enhances the coupling between the clip 100 and the surface 300. In addition, the head portion 72 being on the inside of head portion 70 is configured to engage blade 210 tightly to enhance the coupling between the clip 100 and blade 210.

In some embodiments, each leg 62 may include a sloping portion such that, while engaging slot 250, legs 63 are configured to spring in and then spring back when clip 100 engages the slot 250. In some embodiments, each leg 62 may include at least one depressed portion 600. The depressed portion 600 is formed and is configured to engage a portion of the slot 250 of surface 300. In some embodiments, slot 250 may have any shape such as a circle, a square, a rectangle, a pentagon, a hexagon, a polygon, an n-sided polygon where n is a whole number, an ellipse, an oval, etc.

In some embodiments, the depressed portion 600 may include, for example, an abrupt edge, a gradual angled edge, such as a curve, a single angled edge, a discrete multiangled edge or a pointed edge. The depressed portion 600 may be formed on the depressed part of each leg 60 so as to engage the slot 250 to increase an extraction force for the fastener clip 20 from the slot 250. The depressed portion 600 may be sized to suitably engage slot 250 of the surface 300 in order to obtain the desired level of extraction force. According to one embodiment, the depressed portion 600 may be a depression formed on legs 62. The size and shape of the depressed portion 600 may be formed in any suitable manner in order to permit relatively easy insertion of the fastener clip 100 into the slot 250 while increasing the extraction force.

Figure 6:
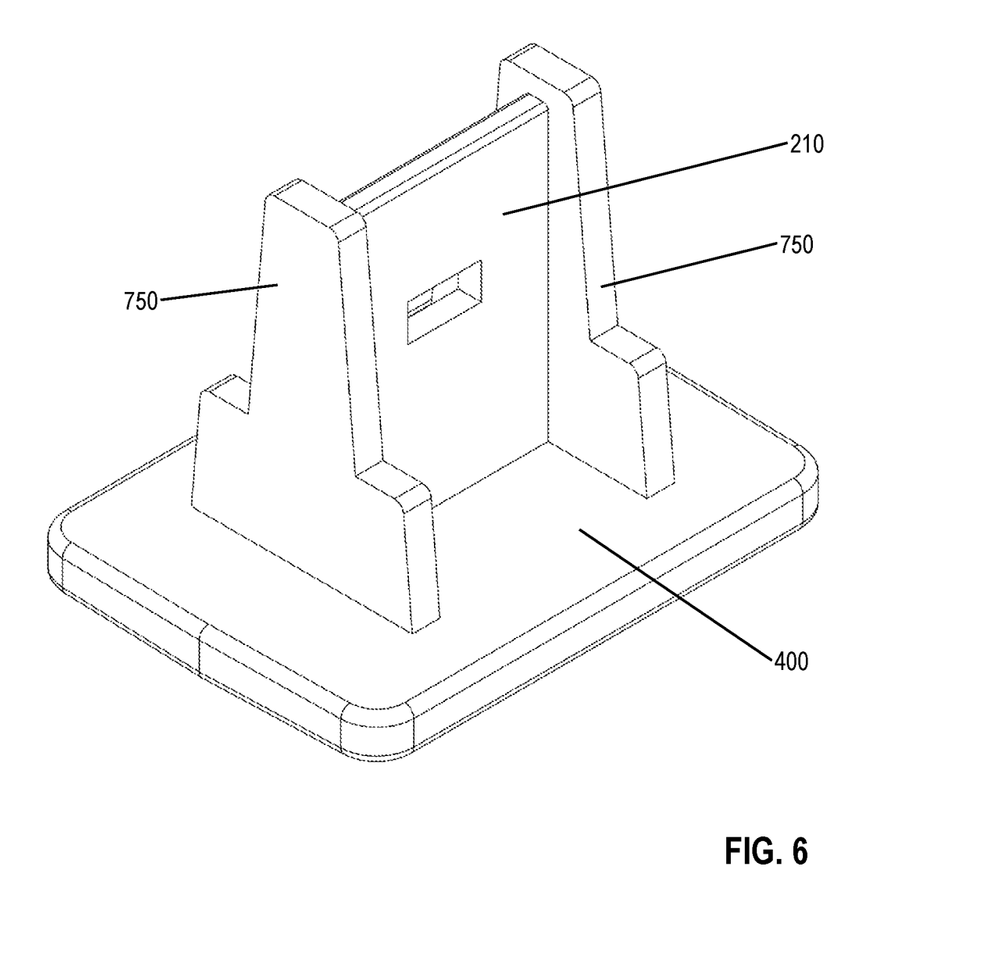
FIG. 6 is a perspective view of a blade configured to receive a fastener clip, in accordance with some embodiments.

FIG. 6 is a perspective view of a blade configured to receive a fastener clip, in accordance with some embodiments.

In some embodiments, blade 210 is configured to receive and attach to fastener clip 100.

Blade 210 may be either attached to or be part of surface 400. In embodiments where surface 400 is made of plastic, for example, the structure of blade 210 may be molded as part of surface/structure 400. In some embodiments, surface/structure 400 may be an automobile panel that is to be attached to the automobile chassis.

In some embodiments, guiding structures 750, positioned on either side of blade 210, are configured to guide fastener clip 100 over blade 210 as the fastener clip is being inserted over the blade. In addition, guiding structures 750 are configured to provide additional stability to the coupling between blade 210 and fastener clip 100 after installation.

Figure 7:
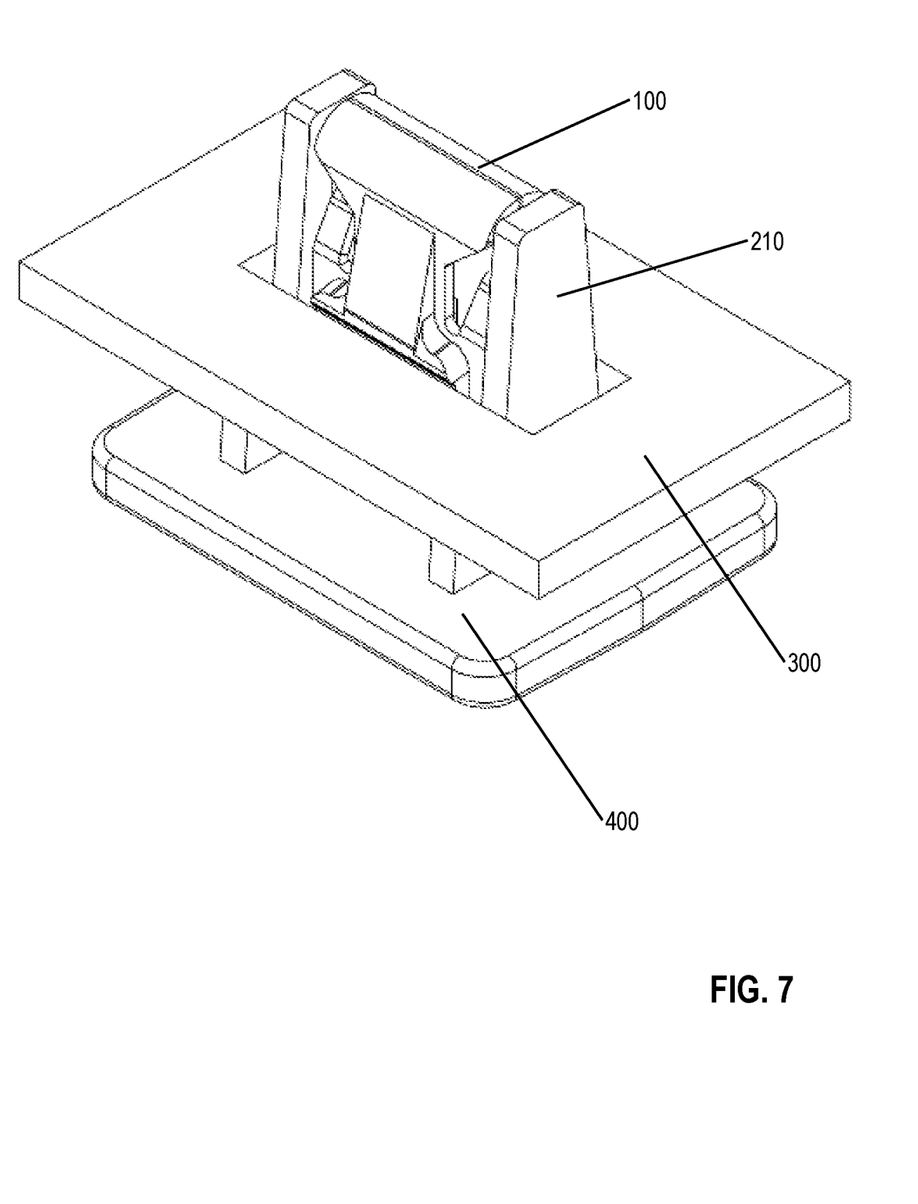
FIG. 7 is a perspective view of a fastener clip attached to a chassis, in accordance with some embodiments.

FIG. 7 is a perspective view of a fastener clip attached to a chassis, in accordance with some embodiments.

In some embodiments, the fastener clip assembly is configured to join together two surfaces such as surfaces 300 and 400. Fastener clip 100 is configured to fit over and attach to blade 210 that is attached to surface 400, and in addition fastener clip 100 is configured to removably attach to the slot in surface 200. For example, the fastener clip system may be used to fasten together a body panel to the chassis of an automobile.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip comprising:
a first piece made of a first material, wherein the first material is elastic, wherein the first piece comprises:
a first pair of legs joined at a first head portion, wherein the first legs form a clip opening at an opposite end of the first head portion;
one or more pairs of barbs coupled to the first pair of legs,
wherein the barbs are configured to dig into a blade coupled to a panel, wherein the fastener clip is configured to be secured over the blade based at least upon the barbs being configured to dig into the blade upon the fastener clip being pushed over the blade;
a second piece made of a second material, wherein the second piece is coupled, to the first piece, wherein the second piece comprises:
a second pair of legs joined at a second head portion, wherein the second pair of legs each comprises at least one depressed portion,
wherein the second material is softer than the first material, wherein the second material comprises inside portions to the inside of the first piece and outside portions to the outside of the first piece,
wherein the second pair of legs are substantially to the outside of the first pair of legs, wherein the second pair of legs is configured to engage a slot in a chassis based at least upon the fastener clip being pushed into the slot, the first and second pair legs together being configured to spring in and then out over the slot, and the depressed portions being configured to engage a top of the slot.

2. The fastener clip of claim 1, wherein the second head portion is to the inside of the first head portion.

3. The fastener clip of claim 1, wherein the first piece further comprises a pair of first feet correspondingly coupled to the first pair of legs at the ends of the first pair of legs opposite the first head portion, and wherein the second piece further comprises a pair of second feet correspondingly coupled to the second pair of legs at the ends of the second pair of legs opposite the second head portion.

4. The fastener clip of claim 1, wherein the fastener clip is configured to couple the chassis to the panel based at least upon the fastener being configured to be secured to the blade and to the slot in the chassis.

5. The fastener clip of claim 1, wherein the second piece is configured to fit over a top of the blade.

6. A fastener assembly system comprising:
a chassis comprising a slot;

a panel comprising a blade;
a fastener clip comprising:
   a first piece made of a first material, wherein the first material is elastic,
   wherein the first piece comprises:
      a first pair of legs joined at a first head portion, wherein the first legs form a clip opening at an opposite end of the first head portion;
      one or more pairs of barbs coupled to the first pair of legs,
      wherein the barbs are configured to dig into the blade, wherein the fastener clip is configured to be secured over the blade based at least upon the barbs being configured to dig into the blade upon the fastener clip being pushed over the blade;
   a second piece made of a second material, wherein the second piece is coupled to the first piece, wherein the second piece comprises:
      a second pair of legs joined at a second head portion, wherein the second pair of legs each comprises at least one depressed portion,
      wherein the second material is softer than the first material, wherein the second material comprises inside portions to the inside of the first piece and outside portions to the outside of the first piece,
      wherein the second pair of legs are substantially to the outside of the first pair of legs, wherein the second pair of legs is configured to engage a slot in a chassis based at least upon the fastener clip being pushed into the slot, the first and second pair legs together being configured to spring in and then out over the slot, and the depressed portions being configured to engage a top of the slot.

7. The fastener assembly system of claim 6, wherein the second head portion is to the inside of the first head portion.

8. The fastener assembly system of claim 6, wherein the first piece further comprises a first pair of feet correspondingly coupled to the first pair of legs at the ends of the first pair of legs opposite the first head portion, and wherein the second piece further comprises a pair of second feet correspondingly coupled to the second pair of legs at the ends of the second pair of legs opposite the second head portion.

9. The fastener assembly system of claim 6, wherein the fastener clip is configured to couple the chassis to the panel based at least upon the fastener being configured to be secured to the blade and to the slot in the chassis.

10. The fastener assembly system of claim 6, wherein the second piece is configured to fit over a top of the blade.

* * * * *